(12) United States Patent
Tanabe et al.

(10) Patent No.: US 12,146,585 B2
(45) Date of Patent: Nov. 19, 2024

(54) PINCH VALVE ACTUATED BY NON-CONTACT FORCE

(71) Applicants: I Peace, Inc., Palo Alto, CA (US); Aquatech Co., Ltd., Osaka (JP)

(72) Inventors: Koji Tanabe, Palo Alto, CA (US); Ryoji Hiraide, Kyoto (JP); Hiroshi Nakamoto, Daito (JP); Hiroaki Inoue, Daito (JP)

(73) Assignees: I Peace, Inc., Palo Alto, CA (US); Aquatech Co., Ltd., Osaka (JP)

( * ) Notice: Subject to any disclaimer, the term of this patent is extended or adjusted under 35 U.S.C. 154(b) by 0 days.

(21) Appl. No.: 18/247,843

(22) PCT Filed: Oct. 8, 2020

(86) PCT No.: PCT/JP2020/038111
§ 371 (c)(1),
(2) Date: Apr. 4, 2023

(87) PCT Pub. No.: WO2022/074782
PCT Pub. Date: Apr. 14, 2022

(65) Prior Publication Data
US 2023/0366483 A1    Nov. 16, 2023

(51) Int. Cl.
*F16K 31/56* (2006.01)
(52) U.S. Cl.
CPC .................................. *F16K 31/56* (2013.01)
(58) Field of Classification Search
CPC ... F16K 7/045; F16K 1/16; F16K 1/18; F16K 1/20
USPC ........................................................ 251/4, 9
See application file for complete search history.

(56) References Cited

U.S. PATENT DOCUMENTS

| | | | | |
|---|---|---|---|---|
| 3,335,753 | A * | 8/1967 | Kiser | B67D 3/0003 251/9 |
| 3,924,631 | A * | 12/1975 | Mancusi, Jr. | A61B 17/122 128/DIG. 25 |
| 3,960,224 | A * | 6/1976 | Silvers | G01G 13/30 604/245 |
| 4,269,333 | A * | 5/1981 | Nakai | B67D 3/00 222/506 |
| 4,360,007 | A * | 11/1982 | Levy | A61M 39/285 128/DIG. 25 |
| 5,368,013 | A * | 11/1994 | Herweyer | F24D 12/02 122/14.31 |

(Continued)

FOREIGN PATENT DOCUMENTS

JP    5270177 B2    8/2013
JP    5600180 B2    10/2014

OTHER PUBLICATIONS

International Search Report issued in PCT/JP2020/038111; mailed Jan. 12, 2021.

*Primary Examiner* — Daphne M Barry
(74) *Attorney, Agent, or Firm* — Studebaker & Brackett PC

(57) ABSTRACT

A valve including a case 3, a tube 1 disposed in the case 3, a hinge fulcrum 4 disposed in the case 3, a contact member 5 connected to the hinge fulcrum 4 and capable of coming into contact with the tube 1, and a driving device 10 configured to apply a non-contact force to the contact member 5 from outside of the case 3 and change a contact force that is applied to the tube 1 by the contact member 5 to change an inner diameter of the tube 1.

12 Claims, 7 Drawing Sheets

(56) References Cited

U.S. PATENT DOCUMENTS

| | | | | |
|---|---|---|---|---|
| 5,409,194 A * | 4/1995 | Blanc | ................... | G05D 7/0635 |
| | | | | 251/9 |
| 5,665,070 A * | 9/1997 | McPhee | ............ | A61M 5/14276 |
| | | | | 222/105 |
| 8,197,235 B2 * | 6/2012 | Davis | ...................... | F04B 43/04 |
| | | | | 417/474 |
| 2008/0169444 A1 | 7/2008 | Guala | | |
| 2011/0100476 A1 | 5/2011 | Park et al. | | |
| 2013/0118619 A1 * | 5/2013 | Loth | ................ | A61M 37/0076 |
| | | | | 137/625 |
| 2018/0245699 A1 * | 8/2018 | Lee | .......................... | F16K 7/06 |

* cited by examiner

Fig. 5
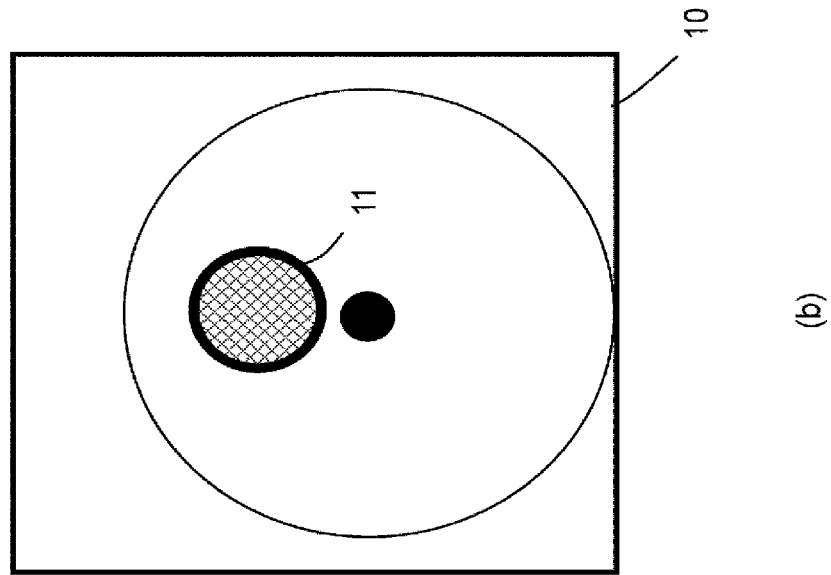
(b)
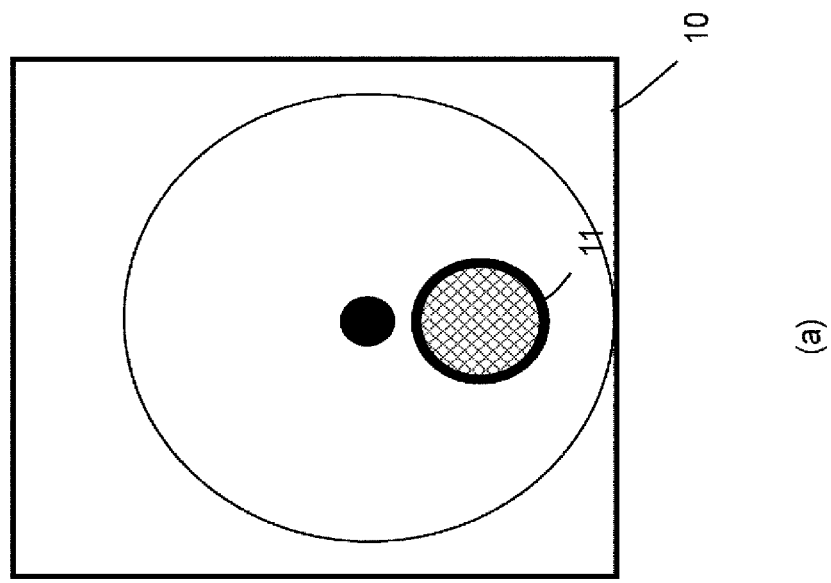
(a)

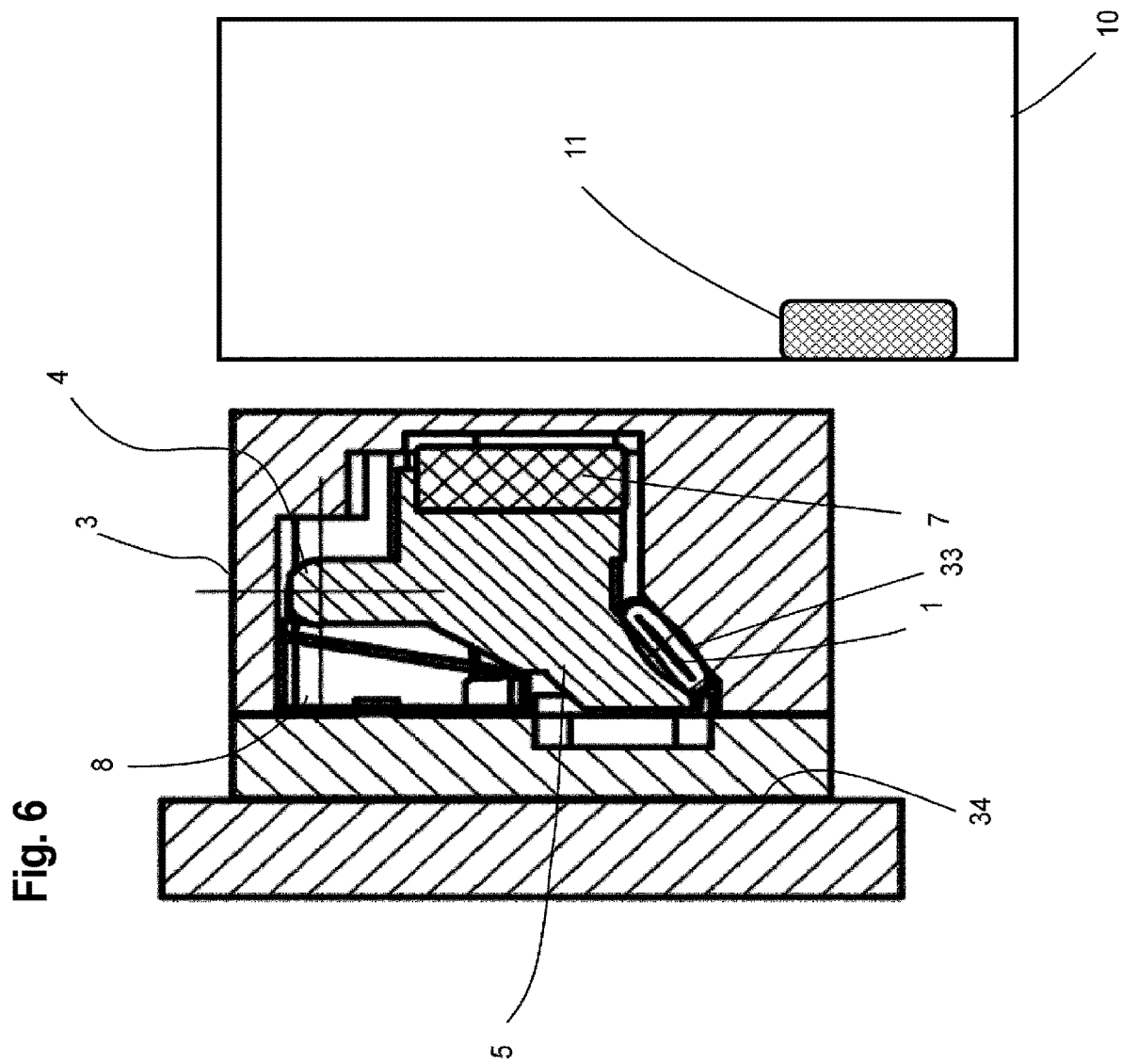

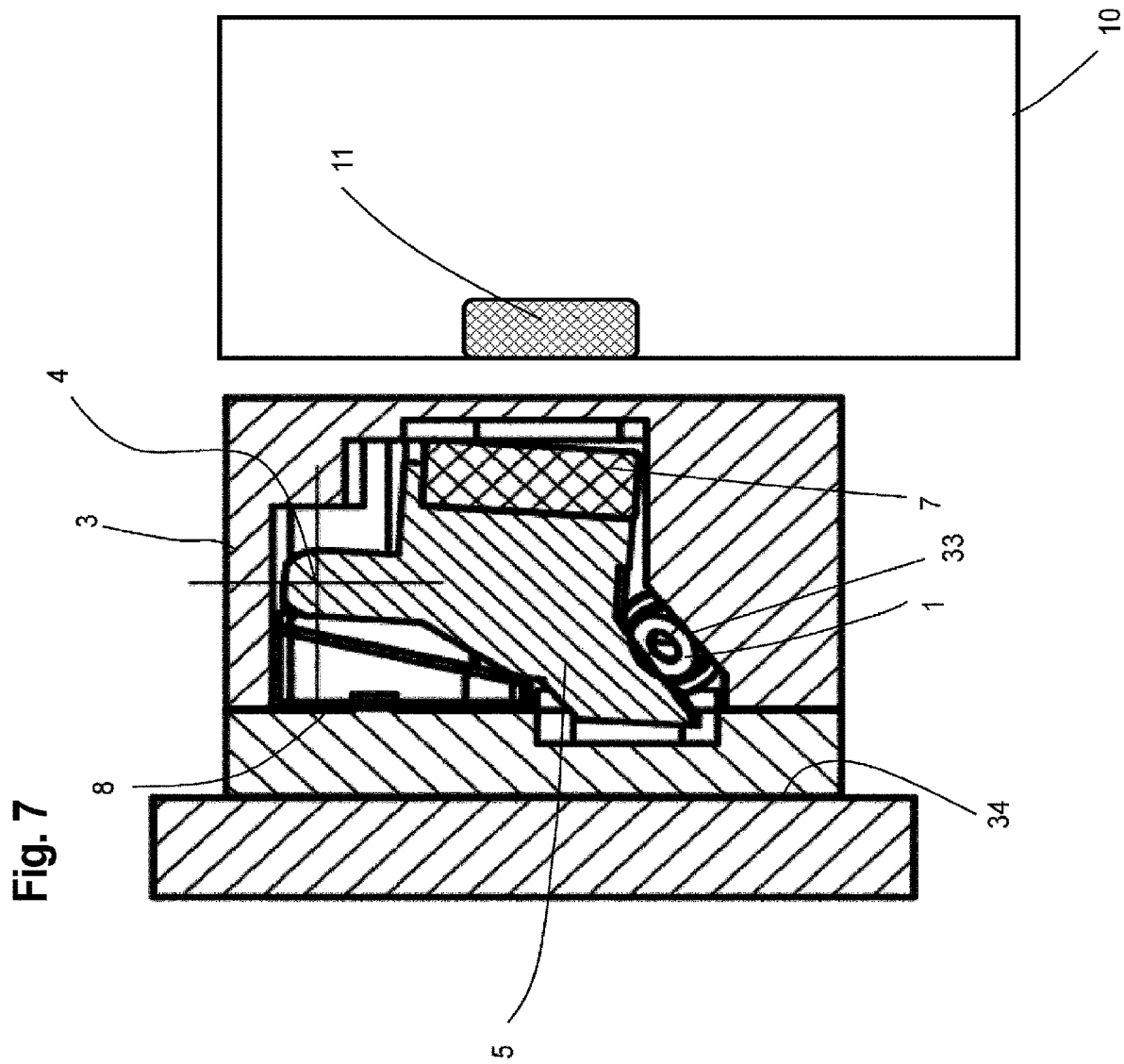

PINCH VALVE ACTUATED BY NON-CONTACT FORCE

TECHNICAL FIELD

The present invention relates to a valve.

BACKGROUND ART

In a flow path through which a fluid flows, the flow rate of the fluid is controlled with a valve (for example, refer to Patent Documents 1 and 2).

CITATION LIST

Patent Documents

Patent Document 1: Japanese Patent No. 5270177
Patent Document 2: Japanese Patent No. 5600180

SUMMARY

Technical Problem

In a case where a fluid flowing through a flow path is preferably clean, the fluid is preferably kept clean when passing through a valve. Therefore, one object of the present invention is to provide a valve capable of adjusting the flow rate of a fluid while keeping the fluid clean.

Solution to Problem

According to an aspect of the present invention, there is provided a valve including a case, a tube disposed in the case, a hinge fulcrum disposed in the case, a contact member connected to the hinge fulcrum and capable of coming into contact with the tube, and a driving device configured to apply a non-contact force to the contact member from outside of the case and change a contact force that is applied to the tube by the contact member to change an inner diameter of the tube.

In the valve, the tube may be disposed along an inner wall of the case.

In the valve, the contact member may be configured to press the tube against the inner wall.

In the valve, the contact member may be configured so as not to close the tube in a case where the non-contact force is not applied to the contact member.

In the valve, the contact member may move toward the tube in a case where the non-contact force is applied to the contact member.

In the valve, the contact force that is applied to the tube by the contact member may increase in a case where the non-contact force that is applied to the contact member increases.

In the valve, the contact member may be configured so as to close the tube in a case where the non-contact force is not applied to the contact member.

In the valve, the contact member may move away from the tube in a case where the non-contact force is applied to the contact member.

The valve may further include a pressing member configured to press the contact member against the tube.

In the valve, the contact force that is applied to the tube by the contact member may decrease in a case where the non-contact force that is applied to the contact member increases.

In the valve, a magnet may be provided in the contact member, and the driving device may move the contact member by a magnetic force through the magnet.

In the valve, the case may be closed.

In the valve, the case may not be fluid-permeable.

In the valve, the case may not be liquid-permeable.

In the valve, an inlet connector and an outlet connector may be provided in the case, one end of the tube may be connected to the inlet connector, and the other end of the tube maybe connected to the outlet connector.

In the valve, the case and the driving device may be separable from each other.

Advantageous Effects of Invention

According to the present invention, it is possible to provide a valve capable of adjusting the flow rate of a fluid while keeping the fluid clean.

BRIEF DESCRIPTION OF DRAWINGS

FIG. 5 is a schematic side view of a driving device of the valve according to the first embodiment as viewed from a side facing a case.

FIG. 6 is a schematic cross-sectional view of a valve according to a second embodiment as viewed from a side.

FIG. 7 is a schematic cross-sectional view of the valve according to the second embodiment as viewed from the side.

DESCRIPTION OF EMBODIMENTS

Hereinafter, embodiments of the present invention will be described. In the following description of drawings, identical or similar portions will be indicated by identical or similar reference signs. However, the drawings are schematic. Therefore, specific dimensions and the like should be determined by referring the following description. In addition, it is needless to say that there may be a portion where the relationship or ratio between dimensions does not match between drawings.

First Embodiment

Figure 1:
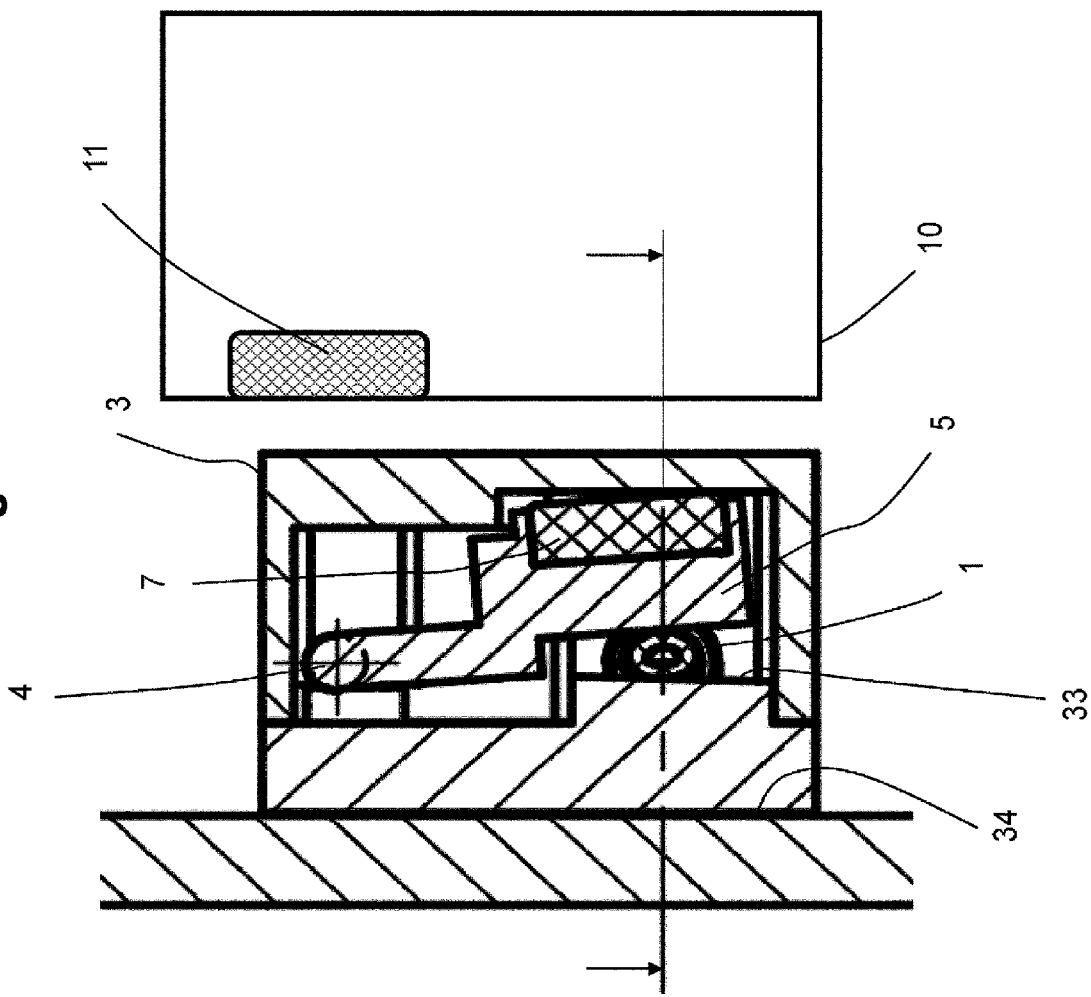
FIG. 1 is a schematic cross-sectional view of a valve according to a first embodiment as viewed from a side.
Figure 2:
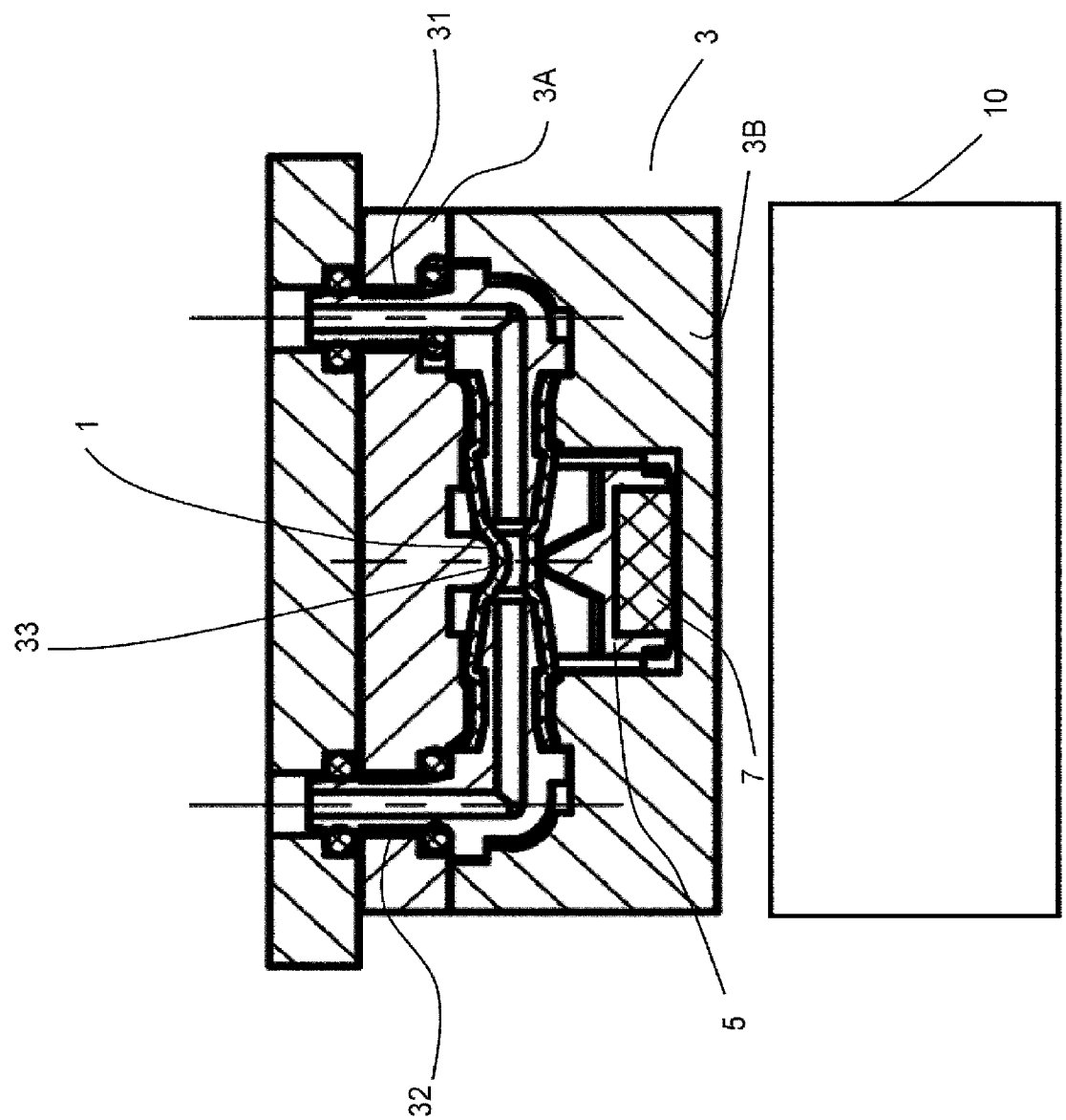
FIG. 2 is a schematic cross-sectional view of the valve according to the first embodiment as viewed from above.

As illustrated in FIG. 1 and FIG. 2, a valve according to a first embodiment includes a case 3, a tube 1 disposed in the case 3, a hinge fulcrum 4 disposed in the case 3, a contact member 5 connected to the hinge fulcrum 4 and capable of coming into contact with the tube 1, and a driving device 10 configured to apply a non-contact force to the contact member 5 from the outside of the case 3 and change a contact force that is applied to the tube 1 by the contact member 5 to change the inner diameter of the tube 1.

A fluid flows in the tube 1. In the present disclosure, the fluid includes gas and liquid. The tube 1 is, for example, elastically deformable and flexible. The inside of the tube 1 can be closed by pinching the tube 1 from both sides and thereby compressing the tube 1. A material of the tube 1 is selected so that, for example, the inside of the tube 1 does not exchange gases, viruses, microorganisms, impurities, and the like with the outside through a wall of the tube 1. As the material of the tube 1, a resin is an exemplary example.

The case 3 can be divided into, for example, a case 3A and a case 3B. The case 3A and the case 3B can be, for example, engaged together. A material of the case 3 is, for example, not fluid-permeable. For example, the case 3 is provided with an inlet connector 31 and an outlet connector 32. One end of the tube 1 is connected to the inlet connector 31, and the other end of the tube 1 is connected to the outlet connector 32. The inlet connector 31 and the outlet connector 32 may be integrated with the case 3. Alternatively, the inlet connector 31 and the outlet connector 32 may be separable from the case 3. In this case, the inlet connector 31 and the outlet connector 32 may be disposed in the case 3 through sealing members such as O rings.

When both ends of the tube 1 are connected to the inlet connector 31 and the outlet connector 32 and the case 3A and the case 3B are engaged together, the inside of the case 3 is closed from the outside. The inside of the closed case 3 may be a vacuum. The inside of the closed case 3 may be filled with an inert gas such as nitrogen or argon. The inside of the closed case 3 may be filled with liquid or gel. When the case 3 is closed, even if there is a fluid inside the case 3, the fluid inside the case 3 is not capable of flowing outside. In addition, when the case 3 is closed, the fluid outside the case 3 is not capable of entering the inside of the case 3. Therefore, the inside of the case 3 does not exchange gases, viruses, microorganisms, impurities, and the like with the outside.

The tube 1 is disposed along an inner wall 33 of the case 3. A space may be present between the inner wall 33 and an outer wall 34 of the case 3. The contact member 5 is rotatable around the hinge fulcrum 4. The tube 1 is disposed between the inner wall 33 of the case 3 and the contact member 5. A protrusion may be provided on a portion of the contact member 5 that comes into contact with the tube 1. A protrusion may be provided on a portion of the inner wall 33 of the case 3 that faces the portion of the contact member 5 that comes into contact with the tube 1.

The valve according to the first embodiment may include a magnet 7 provided in the contact member 5. The number of the magnets 7 is arbitrary. The driving device 10 that is disposed outside the case 3 includes a magnet 11. The case 3 and the driving device 10 are separable from each other. Therefore, the case 3 and configuration elements therein are disposable, and the driving device 10 can be reused with respect to the case 3 and the configuration elements therein that have been exchanged with new products. A repulsive force attributed to a magnetic force, which is a non-contact force, is generated between the magnet 7 connected to the contact member 5 and the magnet 11 provided in the driving device 10. The driving device 10 outside the case 3 rotates the contact member 5 inside the case 3 around the hinge fulcrum 4 using the repulsive magnetic force between the magnet 11 and the magnet 7.

For example, as illustrated in FIG. 1, in a case where the magnet 11 provided in the driving device 10 is separated from the magnet 7 connected to the contact member 5, no repulsive force is generated between the magnet 11 provided in the driving device 10 and the magnet 7 connected to the contact member 5. In this case, the tube 1 is loaded from the contact member 5, but the masses of the contact member 5 and the magnet 7 and the material and structure of the tube 1 are set so that the tube 1 is not closed due to the load from the contact member 5 alone.

Figure 3:
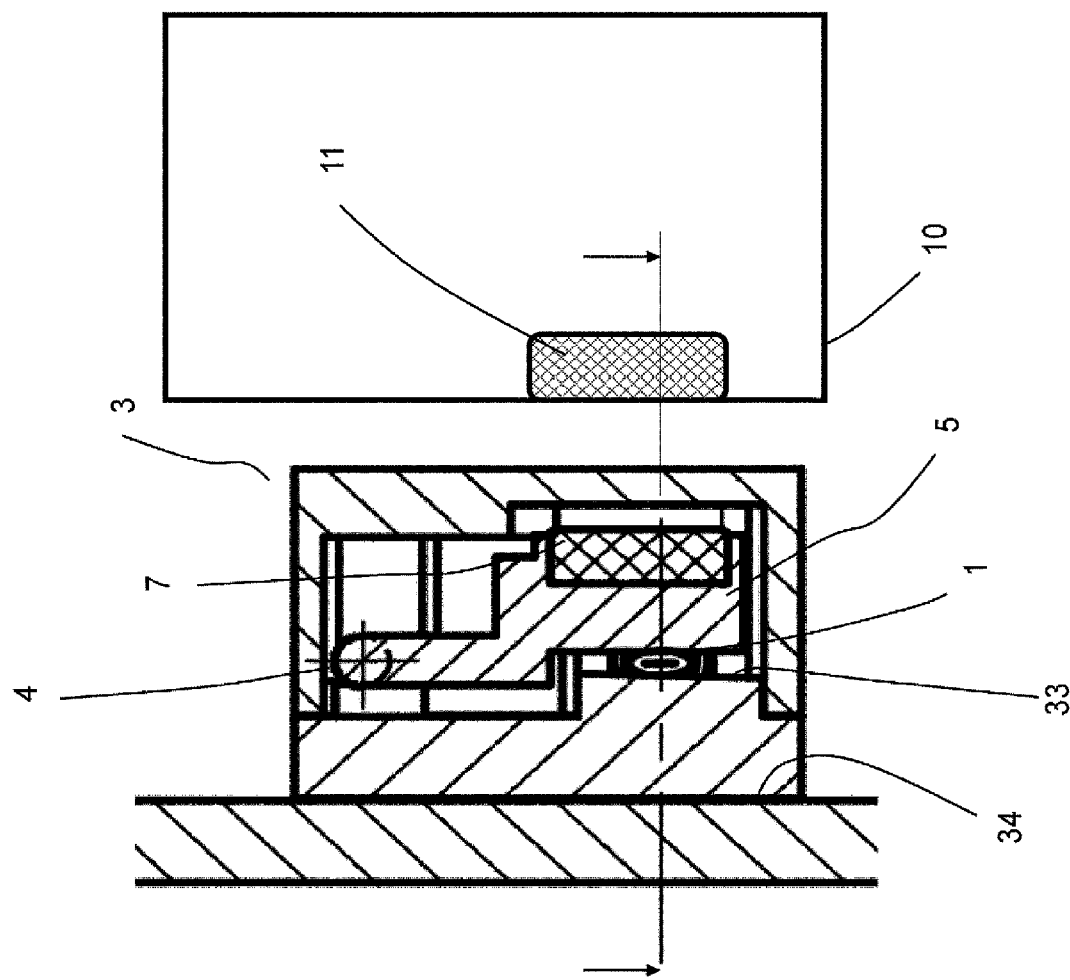
FIG. 3 is a schematic cross-sectional view of the valve according to the first embodiment as viewed from the side.
Figure 4:
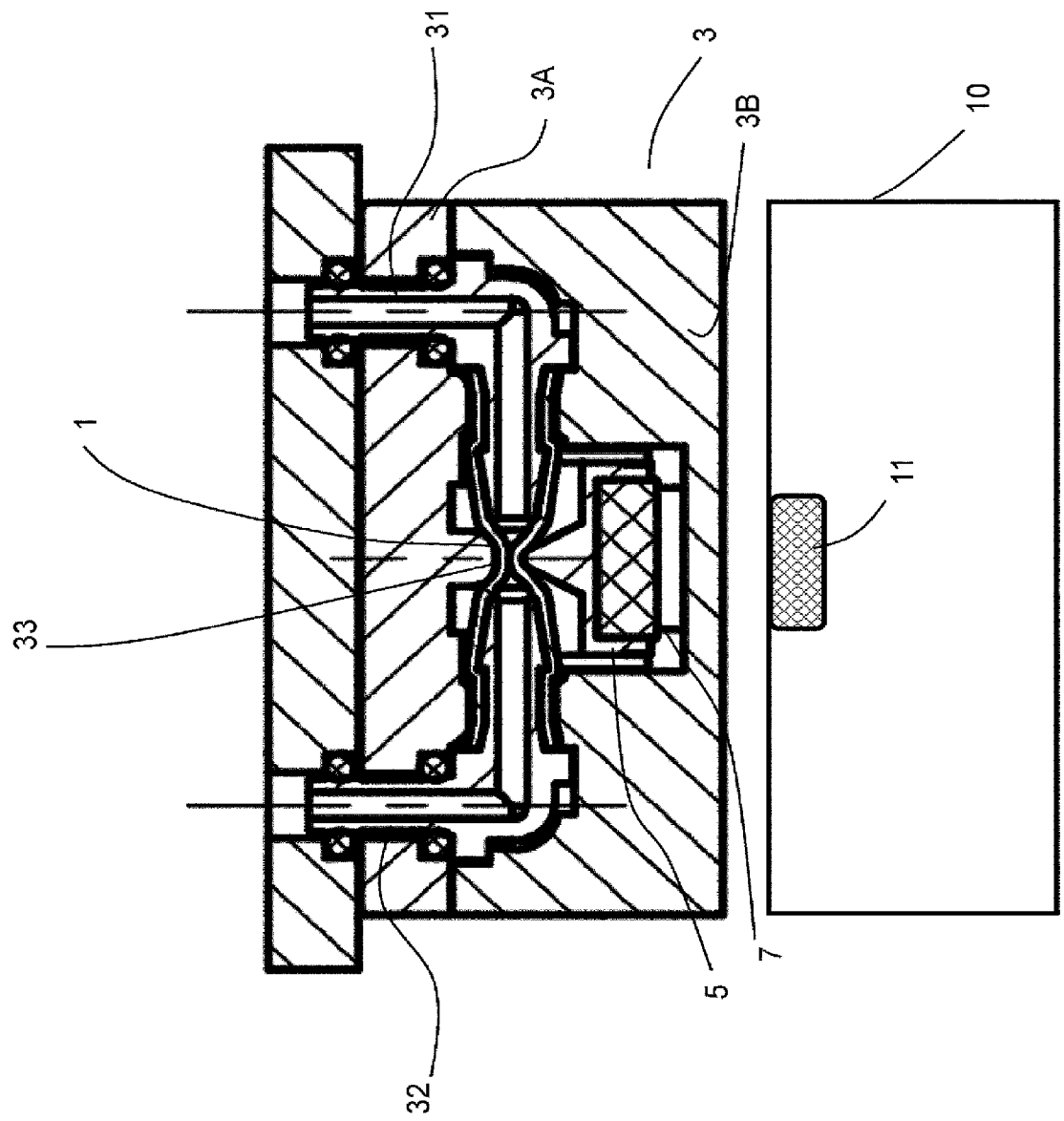
FIG. 4 is a schematic cross-sectional view of the valve according to the first embodiment as viewed from above.

As illustrated in FIG. 3, in a case where the magnet 11 provided in the driving device 10 comes close to the magnet 7 connected to the contact member 5, a repulsive force is generated between the magnet 11 provided in the driving device 10 and the magnet 7 connected to the contact member 5. Therefore, the contact member 5 moves toward the tube 1, the contact force that is applied to the tube 1 by the contact member 5 increases, and the contact member 5 presses the tube 1 against the inner wall 33 of the case 3. The inner diameter of the tube 1 pinched by the inner wall 33 of the case 3 and the contact member 5 decreases, and the flow rate of the fluid flowing in the tube 1 decreases. As illustrated in FIG. 4, when the inside of the tube 1 pinched by the inner wall 33 of the case 3 and the contact member 5 is closed, the flow of fluid flowing in the tube 1 stops.

The inner diameter of tube 1 can be adjusted by adjusting the contact force that is applied to the tube 1 by the contact member 5. The contact force that is applied to the tube 1 by the contact member 5 can be adjusted by adjusting the repulsive force between the magnet 7 connected to the contact member 5 and the magnet 11 provided in the driving device 10. The repulsive force between the magnets 7 and 11 can be adjusted by adjusting the facing area of the magnet 7 and the magnet 11 or the distance between the magnet 7 and the magnet 11.

The driving device 10 includes, for example, a rotor 12 as illustrated in FIG. 5. The magnet 11 is disposed in the rotor 12. When the rotor 12 rotates, the disposition of the magnet 11 is changed. Therefore, rotating the rotor 12 makes it possible to change the facing area between the magnet 7 provided in the contact member 5 and the magnet 11 provided in the driving device 10.

According to the valve according to the first embodiment, it is possible to control the flow rate of the fluid flowing in the tube 1 having the inside shielded by the case 3 in a non-contact manner with the driving device 10 disposed outside the case 3. Therefore, even when the tube 1 breaks, it is possible to prevent a substance inside the tube 1 from scattering outside the case 3.

In addition, according to the valve of the first embodiment, it is possible to prevent an object outside the case 3 from entering the tube 1 and thereby causing contamination in the fluid in the tube 1. For example, at the time of controlling the flow rate of a clean fluid such as a culture solution, a medical solution, a biomolecule solution, or a chemical solution with the valve, it is possible to prevent viruses or bacteria from entering the liquid in the tube 1. Furthermore, for example, at the time of controlling the flow rate of a fluid for which the pH needs to be kept constant such as a culture solution, a medical solution, a biomolecule solution, or a chemical solution with the valve, it is possible to prevent an acidic or alkaline fluid from entering the tube 1 and thereby change the pH of the liquid in the tube 1.

Second Embodiment

In the valve according to the first embodiment, an example in which, as illustrated in FIG. 1 and FIG. 2, in a case where no non-contact force is applied to the contact member 5, the contact member 5 is configured so as not to close the tube 1, and, as illustrated in FIG. 3 and FIG. 4, when the non-contact force that is applied to the contact member 5 increases, the contact force that is applied to the tube 1 by the contact member 5 increases has been described.

In contrast, in a valve according to a second embodiment, as illustrated in FIG. 6, the contact member 5 may be configured so as to close the tube 1 in a case where no non-contact force is applied to the contact member 5. For example, the masses of the contact member 5 and the magnet 7 and the material and structure of the tube 1 are set so that the contact member 5 presses the tube 1 against the inner wall 33 of the case 3 and the tube 1 closes in a case where no non-contact force is applied to the contact member 5. In addition, the valve according to the second embodiment may further include a pressing member 8 configured to press the contact member 5 against the tube 1. Examples of the pressing member 8 include a spring.

As illustrated in FIG. 7, in a case where the magnet 11 provided in the driving device 10 comes close to the magnet 7 connected to the contact member 5, a repulsive force is generated between the magnet 11 provided in the driving device 10 and the magnet 7 connected to the contact member 5. Therefore, the contact member 5 moves away from the tube 1, and the contact force that is applied to the tube 1 by the contact member 5 decreases. The inner diameter of the tube 1 pinched by the inner wall 33 of the case 3 and the contact member 5 increases, and the flow rate of a fluid flowing in the tube 1 increases.

In the valve according to the second embodiment, in a case where the driving device 10 applies no non-contact force to the contact member 5, the tube 1 is in a closed state. Therefore, for example, in a case where a power supply is not connected to the driving device 10 or where the driving device 10 is not yet disposed nearby, even when vibrations are applied to a flow path circuit including the valve, it is possible to suppress the unintentional flow of a fluid in the tube 1.

The present invention has been described with the embodiments as described above, but description and drawing that form a part of this disclosure should not be understood to limit this invention. This disclosure should make a variety of alternative embodiments, embodiments and operational techniques apparent to those skilled in the art. For example, the driving device 10 may adjust the contact force that is applied to the tube 1 by the contact member 5 by moving the magnet 11 provided in the driving device 10 close to or away from the magnet 7 provided in the contact member 5. In addition, the contact force that is applied to the tube 1 by the contact member 5 may be adjusted by a suction force between the magnet 7 connected to the contact member 5 and the magnet 11 provided in the driving device 10. In this case, the magnet 11 provided in the driving device 10 may be disposed at a position so that the contact member 5 pressing the tube 1 moves away from the tube 1 by the suction force. In addition, the magnet is not limited to a permanent magnet and may be an electromagnet. As described above, it should be understood that the present invention includes a variety of embodiments and the like that are not described herein.

REFERENCE SIGNS LIST

1: tube
3: case
3A: case
3B: case
4: hinge fulcrum
5: contact member
7: magnet
8: member
10: driving device
11: magnet
12: rotor
31: inlet connector
32: outlet connector
33: inner wall
34: outer wall

What is claimed is:

1. A valve comprising:
a case;
a tube disposed in the case;
a hinge fulcrum disposed in the case;
a contact member connected to the hinge fulcrum and capable of coming into contact with the tube; and
a driving device configured to apply a non-contact force to the contact member from outside of the case and change a contact force that is applied to the tube by the contact member to change an inner diameter of the tube; wherein the contract member is configured so as to close the tube in a case where the non-contact force is not applied to the contact member.

2. The valve according to claim 1,
wherein the tube is disposed along an inner wall of the case.

3. The valve according to claim 2,
wherein the contact member is configured to press the tube against the inner wall.

4. The valve according to claim 1,
wherein the contact member moves away from the tube in a case where the non-contact force is applied to the contact member.

5. The valve according to claim 1, further comprising:
a pressing member configured to press the contact member against the tube.

6. The valve according to claim 1,
wherein the contact force that is applied to the tube by the contact member decreases in a case where the non-contact force that is applied to the contact member increases.

7. The valve according to claim 1,
wherein a magnet is provided in the contact member, and the driving device moves the contact member by a magnetic force through the magnet.

8. The valve according to claim 1,
wherein the case is closed.

9. The valve according to claim 1,
wherein the case is not fluid-permeable.

10. The valve according to claim 1,
wherein the case is not liquid-permeable.

11. The valve according to claim 1,
wherein an inlet connector and an outlet connector are provided in the case,
one end of the tube is connected to the inlet connector, and the other end of the tube is connected to the outlet connector.

12. The valve according to claim 1,
wherein the case and the driving device are separable from each other.

* * * * *